(12) United States Patent
Skovholt (10) Patent No.: US 9,827,509 B2
(45) Date of Patent: Nov. 28, 2017

(54) METHOD FOR SEPARATING SUBSTANCES MIXED IN FLUIDS FROM OIL WELLS

(71) Applicant: Seabed Separation AS, Trondheim (NO)

(72) Inventor: Otto Skovholt, Trondheim (NO)

(73) Assignee: Seabed Separation AS, Trondheim (NO)

( * ) Notice: Subject to any disclaimer, the term of this patent is extended or adjusted under 35 U.S.C. 154(b) by 57 days.

(21) Appl. No.: 14/654,171

(22) PCT Filed: Dec. 20, 2013

(86) PCT No.: PCT/EP2013/077676
§ 371 (c)(1),
(2) Date: Jun. 19, 2015

(87) PCT Pub. No.: WO2014/096356
PCT Pub. Date: Jun. 26, 2014

(65) Prior Publication Data
US 2015/0343327 A1 Dec. 3, 2015

(30) Foreign Application Priority Data

Dec. 21, 2012 (EP) .................................... 12198846

(51) Int. Cl.
*B01D 17/02* (2006.01)
*E21B 43/34* (2006.01)
(Continued)

(52) U.S. Cl.
CPC ......... *B01D 17/02* (2013.01); *B01D 17/0208* (2013.01); *B01D 17/0214* (2013.01);
(Continued)

(58) Field of Classification Search
CPC ................ B01D 17/02; B01D 19/0073; B01D 21/2422; B01D 17/0208; B01D 17/0217;
(Continued)

(56) References Cited

U.S. PATENT DOCUMENTS

| 5,707,427 A | 1/1998 | Stockman et al. |
| 8,002,121 B2 | 8/2011 | Berard et al. |
| 2011/0259836 A1 | 10/2011 | Noles, Jr. |

FOREIGN PATENT DOCUMENTS

| EP | 0266348 | 5/1988 |
| GB | 2359575 | 8/2001 |

(Continued)

OTHER PUBLICATIONS

International Search Report and Written Opinion dated Mar. 14, 2014 (PCT/EP2013/077676).

*Primary Examiner* — John C Hong
(74) *Attorney, Agent, or Firm* — Alix, Yale & Ristas, LLP (57) ABSTRACT

The present invention relates to a method of adapting and manufacturing a separator system comprising multiple inclined separators for separation of respective substances or substances mixed in fluids from oil wells and adapting the separator system to a change in the substance or use with another oil well. The method involves determining percentage fraction of respective fluid phases in an oil from a specific oil well and at a specific time and estimating expected production rate from the specific oil well at a specific time to estimate the streaming capacity of each respective fluid phase through separators of the separator system. The method also involves arranging a plurality of interconnecting frameworks of pipes in parallel or serial depending on the estimate streaming capacity.

20 Claims, 10 Drawing Sheets

(51) Int. Cl.
*B01D 19/00* (2006.01)
*B01D 21/24* (2006.01)
*B01D 21/28* (2006.01)

(52) U.S. Cl.
CPC ..... *B01D 17/0217* (2013.01); *B01D 19/0068* (2013.01); *B01D 19/0073* (2013.01); *B01D 19/0078* (2013.01); *B01D 21/2416* (2013.01); *B01D 21/2422* (2013.01); *B01D 21/283* (2013.01); *E21B 43/34* (2013.01); *Y10T 29/49766* (2015.01)

(58) Field of Classification Search
CPC . B01D 19/0068; B01D 17/0214; E21B 43/34; Y10T 29/49766
See application file for complete search history.

(56) References Cited

FOREIGN PATENT DOCUMENTS

| | | |
|---|---|---|
| WO | 0201044 | 1/2001 |
| WO | 2004085789 | 10/2004 |
| WO | 2007116008 | 10/2007 |
| WO | 2009024545 | 2/2009 |

METHOD FOR SEPARATING SUBSTANCES MIXED IN FLUIDS FROM OIL WELLS

FIELD OF THE INVENTION

The present invention relates to a method of adapting and manufacturing a separator system comprising multiple inclined separators for separation of respective substances or substances mixed in fluids from oil wells. The method also relates to adapting the separator system to a change in the substance or use with another oil well.

BACKGROUND

Fluids being produced from oil wells may comprise a mixture of fluid components like oil, water, gas, and sand etc., which are commonly referred to as fluid phase, where the percentage fraction of each respective fluid component may vary from one oil field to another, and also during the operational lifetime of the oil from a same oil well. It is for example common to have an increase in water content from the oil well towards the end of the production life time of the well.

Separation of fluid components may be necessary to be able to provide further processing of the oil and gas in a refinery for example. However, the requirement of providing separation is not always a specific requirement. Sometimes it is only necessary to separate water from the oil, either as a course separation process, or with a higher demand on separation results and/or efficiency. There are some proposals for separators in prior art providing separation of water from fluids being produced from oil wells. A common technique is to utilize the known fact that water has a higher density than oil, and therefore it is possible to use gravity as a separating force. A common known separator arrangement is using a large tank where the fluids from the oil well are kept still for a time period. During this time period the gravity forces separate the oil and water, and the water is piled up at the bottom of the tank from where it can be removed, and gas may be piled up at the top of the tank above the oil since gas has a lower density than oil and water. Sand may also be piled up in the bottom of the tank together with the water.

It is also known more active types of separators, for example a class of separators denoted cyclone separators. The patent application EP0266348 A1 from 17 Jun. 1985 disclose a cyclone separator comprising a separating chamber (1), (2) (3); at least one inlet (8), for introducing feed to be separated into the cyclone separator and at least two outlets (4), (10), for discharging material from the separating chamber. The separator comprises at least one generally circumferential slot (20), disposed in the wall of the separating chamber downstream of each inlet slot (20), leading to or communicating with an exit from the separating chamber.

The gravitational separator tank installations are rather large and can usually only be located at centrally located places on land. Especially, in connection with oil production from the sea bed this has been regarded as an unfavourable solution. The paten publication U.S. Pat. No. 8,002,121 with priority from 15 Nov. 2004, by Michel Berard et al., addresses this problem by arranging an in-line flow separator being installable on a sea bed comprising an uphill section of a pipeline connected to a well head, where a first liquid (oil) and a second denser liquid (water) may flow through the separator from the bottom of the separator to an uphill located outlet opening. The second liquid forms a sump due to gravitation extending uphill from the bottom of the separator to an interface between the water and oil. An outlet in the bottom of the separator makes it possible to remove the water (the second liquid) collected in the sump. A series of sensors are arranged in the uphill section to monitor the position of the interface between the water and the oil.

The international patent application WO 02/01044 by Skovholt et al. discloses an inclined gravitational separator having an inner pipe arranged inside an outer pipe. A pipe carrying fluids from an oil well head are arranged to be in fluid communication with the inner pipe via a tube joint located in a bottom surface of the inclined separator. The inner pipe has a plurality of perforations (or holes) in the inner pipe walls, and due to gravity water (and sand if present) in the fluid from the well head will fall through these openings, and will be collected in a sump in the bottom of the outer pipe. The separated oil will flow out of the inner pipe from an opening in a top section of the separator. The pressure from the oil well drives the fluids through the separator system.

However, the plurality of openings, for example round holes, has a tendency to induce turbulence in the streaming flow out from the inner pipe into the outer pipe which may require slowing down the flow of fluids and which may also provide an unfavourable mixing of fluid components, especially in the interface between water and oil. This condition can be difficult to handle if the fluid from the well head is under high pressure. Further, if the speed of the flow of fluid components in the outer pipe is too high, the streaming of fluids past the outside of the openings in the wall of the inner pipe may provide a suction force due to the Venturi effect, as known to a person skilled in the art. Therefore, it is possible that the separator under certain conditions may extract (pump) water from the sump into the stream of fluids in the inner pipe instead of separating for example the water from the oil. Therefore, it may be necessary to reduce the velocity of fluid streaming in the arrangement. According to the teaching of Skovholt et al. this can be achieved with valves that are controlled in a feedback loop, wherein control signals are generated proportional to signals from respective pressure transducers, for example.

It may further be a problem that the interface between the water and oil in the separator may be a diffuse interface (no distinct border line between the fluids) and also that the interface may be located at different levels relative to for example the bottom of the separator. If the interface is too close to the bottom the number of openings in the inner pipe walls the water may fall through due to gravitation will be less compared to a situation where the interface is higher up in the inclined separator. Therefore, the separation capacity may be variable due to for example variable flow rates.

In the patent application WO 02/01044 it is disclosed that a number of separator arrangements may be arranged in parallel to increase the separator capacity or in series to obtain a gradual separation through a series of connected separators. However, due to the possible suction problem discussed above, the flow rate through the respective separators should probably be reduced thereby limiting the total capacity of the arrangement even when there is a plurality of separators arranged in parallel.

Processing of fluids in other processing stages, or at other locations, may dictate the number of separated phases that are needed. The composition and respective percentage fraction of volume of gas, oil, water and sand etc. will vary from the start of production towards the end of production from an oil well. Further, it should also be possible to provide different separation schemes with respect to how many components or phases that it is intended to be separated during different stages of the production lifetime of an oil well. For example, an oil and gas mixture can be separated from water which implies a two phase separator. Another example can be separation of an oil and sand mixture from separated gas and separated water, which implies a three phase separator. All the fluid phases may also be separated which implies for example a four phase separator. In addition, the volume of each phase or fluid component in the fluid mixture will influence the capacity of the system with respect to the separator sections handling each respective fluid component. It is also beneficial to be able to configure which fluid phases that should remain together after passing the separator system if not all phases are separated, for example oil and water, oil and gas etc.

Further, it may be advantageous to be able to combine more separators based on different physical separation principles, for example cyclone separators and/or gravitational separators in an optimized configuration.

There are also other further issues to take into consideration. For example, variable flow rates, oil, water, slugs etc. may provide mechanical stress and shaking of the installation as known to a person skilled in the art.

Hence, an improved method for adapting and manufacturing a separator system to actual conditions would be advantageous.

It is an object of the present invention to provide an alternative to the prior art.

In particular, it may be seen as an object of the present invention to provide an adapted separator system for oil well fluids that solves the above mentioned problems of the known art with a separator system that is may be adapted to a plurality of different oil production requirements during all stages of the lifetime of an oil well.

SUMMARY

One aspect of the present invention involves a method of adapting and manufacturing a separator system having multiple inclined separators, where each separator comprises an assembly of
- an elongated outer, closed tubular section and an elongated, inner tubular section, which is closed in one end and open in another end,
- where the inner tubular section is arranged inside the outer tubular section,
- and where oil well substances are introduced into the open end of the inner tubular section via a tube feed section passing through the outer tubular section and into the inner tubular section,
- and where the inner tubular section comprises multiple slots arranged in a longitudinal direction of the inner tubular section in a circumferential manner,
- where the inclination of the separator facilitates separation of the oil well substances into lower density substances and higher density substances,
- where the lower density substances by buoyancy drift upward through the slots and exit via an upper outlet in the outer tubular section and higher density substances sink downward through the slots and by gravitation exit via a lower outlet in the outer tubular section, and wherein the method comprises a) determining percentage fraction of respective fluid phases in an oil from a specific oil well and at a specific time, b) estimating expected production rate from the specific oil well at a specific time, c) using the results from step a) and step b) to estimate streaming capacity of each respective fluid phase through separators of the separator system, d) using the respective estimates from step c) to adapt multiple separators comprising connecting an estimated number of separators in a serial manner to accommodate enough separator efficiency in the separator system, thereby enabling a separation of a fluid phase to a target purity of the fluid phase, e) using the results in c) and d) to i) arrange at least one first interconnecting framework of pipes providing communication of fluids from a common inlet of fluids into open one or more ends of the inner tubular sections respective parallel and serial interconnected separators of the separator system, ii) arrange at least one second interconnecting framework of pipes providing communication to respective outlets for each respective fluid phase outputs of the separator system.

The method may hereby be used to adapt and manufacture a separator system having a pattern of fluid communications related to specific oil production requirements or changing production parameters during the life time of an oil well.

The method may involve that the aforementioned step d) is expanded by using the results in c) and e) to i) arrange at least one first interconnecting framework of pipes providing communication of fluids from a common inlet of fluids into open one or more ends of the inner tubular sections respective parallel and serial interconnected separators of the separator system, ii) arrange at least one second interconnecting framework of pipes providing communication to respective lower outlets for separated higher density fluid phase outputs of the separator system, iii) arrange at least one third interconnecting framework of pipes providing communication to respective higher outlets for separated lower density fluid phase outputs of the separator system.

By distributing the flow of fluids with interconnected frameworks for inlets to the inner tubular sections, the upper and lower outlets of the separator system it is obtained that the flow may be adapted to suit any current characteristics of the fluid.

The method may involve that the first, second and/or third interconnecting framework of pipes respectively are replaced after installation of the separator system, thereby enabling an adaption of the separator system with respect to changes in composition of the mixed fluids from the oil wells and/or changing production requirements, and/or due to maintenance requirements. This enables a possibility for reconfiguring the system to meet any changed requirements. However, it also enables a replacement of the frameworks due to wear and tear.

The method may involve that the first, second and/or third interconnecting framework of pipes are replaced with interconnection frameworks of pipes providing a different flow through the separators than an earlier interconnection of frameworks of pipes.

The method may involve that the frameworks of pipes may be connected to the separators by releasable tube joints. This eases replacement of the frameworks of pipes.

The method may involve that the separators or frameworks of pipes are fitted with adjustable vents. It is hereby possible to control the flow speed through the separators and between the separators.

The method may in particular involve that the vents are adjusted, when an interconnecting framework of pipes are replaced with interconnection frameworks of pipes providing a different flow through the separators than an earlier interconnection of frameworks of pipes. When the flow is altered an adjustment of the vents may be required to control the flow speed through the separators and between the separators.

The method may involve that respective adjustments of the vents are provided for by electric control signals issued from an associated controller in the system. This makes the adjustments easier than direct, manual adjustment by a control handle, which is much needed as the settings of the vents is quite complex.

The method may also involve, that the inclination of the respective separators are adjusted to a common certain level, or to individual levels for each respective separator. It is hereby obtained, that not only size and shape of the separators may be chosen before the system is manufactured, but that the inclinations of the separators are afterwards adjustable, which provides a further control measure for the system.

The method may involve, that when an interconnecting framework of pipes are replaced with interconnection frameworks of pipes providing a different flow through the separators than an earlier interconnection of frameworks of pipes, the interconnecting framework providing a different flow comprises adding or removing at least one separator to or from operation. This may be used if the fluid more difficult to separate and more separators are needed in the system, but it may also be used if the fluid changes to contain mainly only one, two or three phases in comparison to four phases. As an example is if the fluid becomes mainly gas and water, that is only two phases, then a simplified system may be used with fewer separators.

The method may further involve
performing at regular intervals step a) and investigate if one or more percentage fractions of respective fluid phases has changed above a pre-defined threshold level, and
if a threshold level has been exceeded, then re-performing steps b), c), d), and e).

This constitutes a further part of the method, where the fluid from the oil well is monitored in order to know, when a re-configuration of the system of separators is needed.

The further part of the method may involve, that the separator system reconfigured by replacing existing frameworks of interconnecting pipes with different frameworks of pipes in a configuration arranged for at least one changed level. A changed level of a phase in the fluid means that in order to have an efficient separation, that the frameworks of pipes need reconfiguration.

The respective aspects of the present invention may each be combined with any of the other aspects. These and other aspects of the invention will be apparent from and elucidated with reference to the embodiments described hereinafter.

DESCRIPTION OF THE FIGURES

The separator system used in the method according to the present invention will now be described in more detail with reference to the accompanying figures. The attached figures illustrates examples of embodiments of the separator system.

DETAILED DESCRIPTION

Although the used separator system is described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning 20 of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

Off shore oil production is an increasing industry due to the simple fact that most of the new oil fields are discovered off shore. The challenge of operating oil production plants in open sea with all the environmental restrictions and hazards due to bad weather condition has been not only a challenge, but has also been an inspiration for the industry to develop new inventive technology to overcome the problems.

Oil from on shore as well as off shore oil fields are usually a mixture of gas, oil, water and sand etc. The fluid components are often referred to as phases. Separation of the phases are done in separation systems denoted two phase separators, three phase separators or four phase separators etc., wherein the number of phases indicate how many phases that are actually separated. The content of the respective components or phases of the oil can vary dramatically and therefore it is not always necessary to have an expensive four phase separator installed. However, if the water content is low at the beginning of production from an oil well it is common known that the content of water increases after a while. This is due to for example features of the geology in the oil containing formation. For example, the pressure inside the oil formation may be lower after a period of production enabling inflow of water from surrounding formations.

Therefore, it might be an optimal and cost effective approach to have separation systems that has only two phases, for example separation of gas and oil in a starting time span of production of oil from a well. After a while (maybe some years) the mixture of components in the oil from the oil well may change in amount and/or percentage volume of the respective components. Then there will be a need for changing the separation system to enable for example water separation at a certain volume rate. Therefore, the configuration of the separator system should be changed, for example different types of separators might be replacing existing separators and/or may be added. If the separation of the mixture of components takes place at the well head the amount of oil that can be shipped through oil pipe lines for further processing in plants will be higher compared to a situation where the pipe lines convey a mixture of oil and water. Otherwise the separation might take place at other locations, for example on the deck of an oil producing platform at open sea.

However, due to environmental requirements, and also due to production technical requirements, it is known in prior that it is beneficial to separate the water close to the well head and sometimes allow injection of the water back into the oil containing formations to induce or maintain a pressure inside the oil containing formations, or to maintain structural integrity of the formations.

When a separator system is intended to be located on a seabed location close to a subsea oil well, the installation process may be difficult. If the system has to be changed or upgraded due to changing properties of the oil from the well, this will also indeed be a difficult operation.

Figure 1:
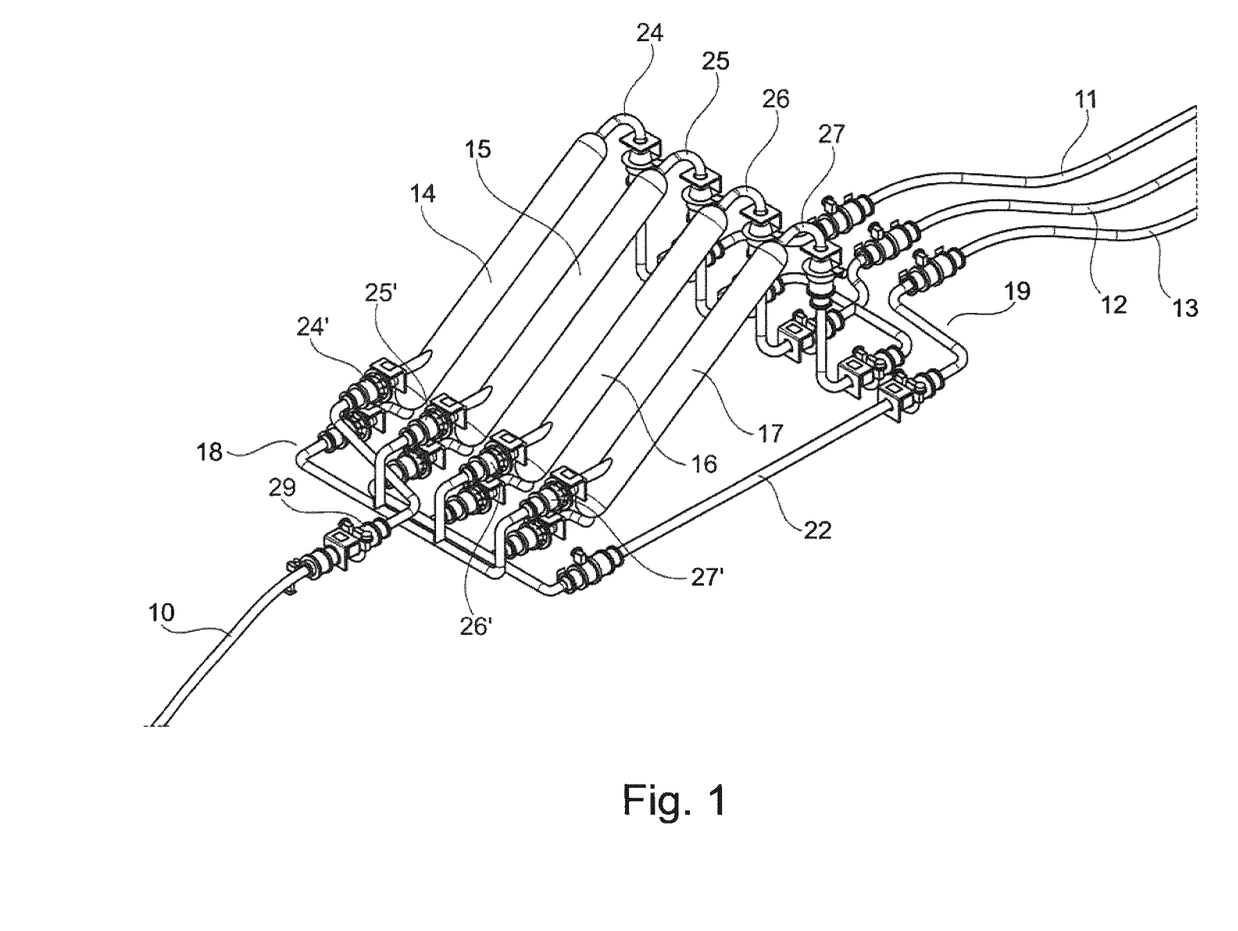
FIG. 1 illustrates an example of embodiment of a separator system used in the method according to the present invention.
Figure 8:
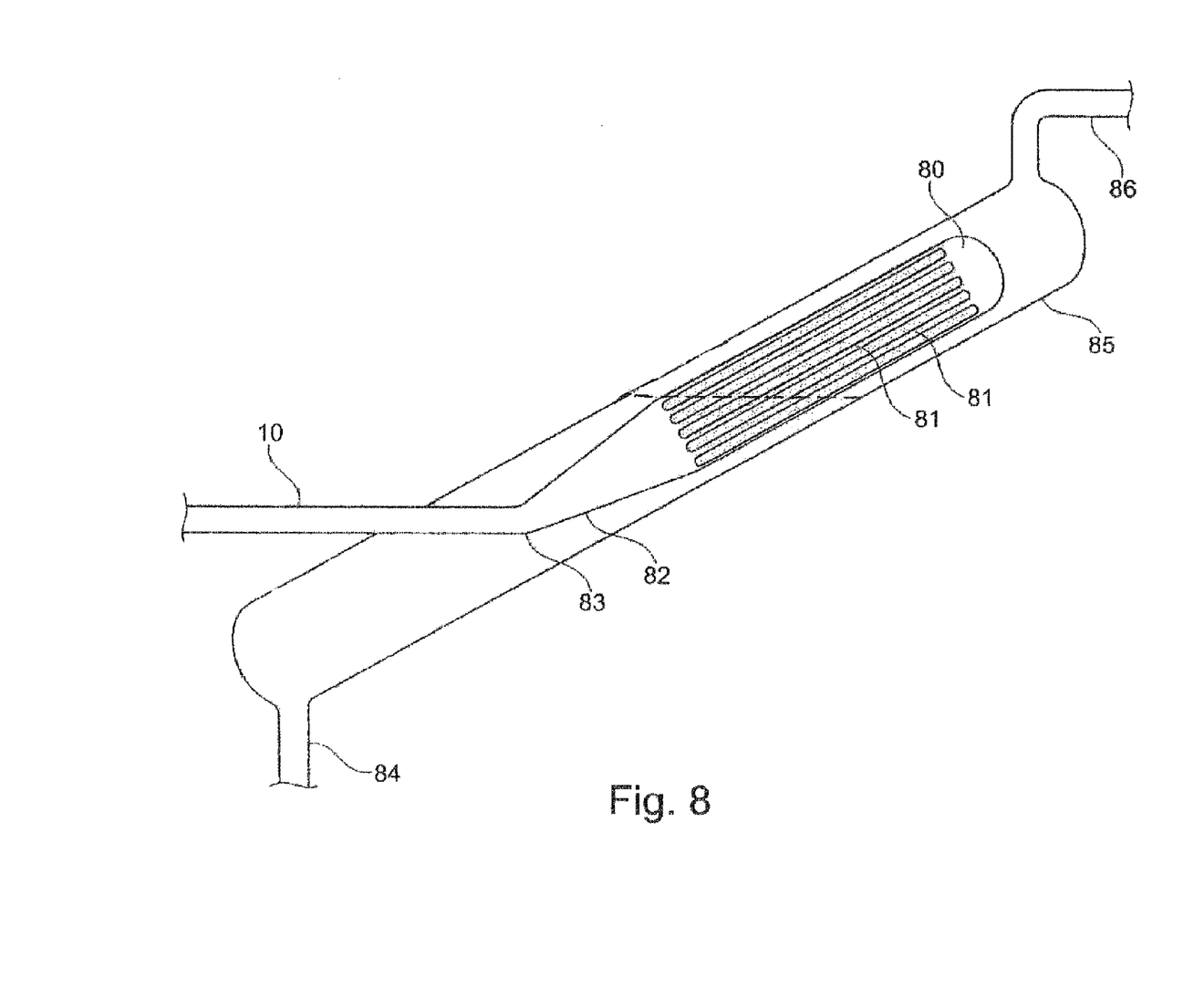
FIG. 8 illustrates an example of a separator section used in the method according to the present invention.

FIG. 1 illustrates an example of embodiment of a separator system used in the method of the present invention. The example depicted in FIG. 1 comprises four interconnected separator sections using gravity as the separating force. In an example of embodiment, the separator system may comprise separator sections as illustrated in FIG. 8 and/or FIG. 9. These separator sections are described in more detail below.

Each separator section 14, 15, 16, 17 has a respective inlet opening 24', 25', 26', 27' in a bottom section of the inclined separator sections, and a respective outlet opening 24", 25", 26", 27" also located in the bottom section of the inclined separator sections (ref. FIG. 2). An outlet opening 24, 25, 26, 27, is located in an upper section of the inclined separator sections. A pipe 10 is in one end connected to an oil well head (not shown) and in the other end to a common inlet opening 29 of the separator system. An input manifold section 18 constituted by pipes being in one end connected to the common inlet opening 29, and in another end to respective separator sections 14, 15, 16, 17, may interconnect the separator sections in a parallel fashion, or in series, or in a combination of parallel and serial configurations. There is also a pipe section 22, which in this illustrated embodiment having one pipe, but may have more. One end the pipe section 22 is connected to the input manifold section 18, and in another end to an output manifold section 19. The output manifold section 19 comprises pipes that interconnect outlets 24, 25, 26, 27 from the separator sections 14, 15, 16, 17, and the pipe section 22, with respect to the number of phases the separator system is adapted and manufactured to separate. In this illustrated example the separator sections 14, 15, 16, 17 are interconnected such that three outlet openings 25, 26, 27 in the upper section of the inclined separator system from the three respective separator sections 15, 16, 17 are connected together to a common outlet pipe 12, while one outlet 24 in the upper section from a fourth separator section 14 is connected to an outlet pipe 11. A third outlet pipe 13 is connected to the pipe section 22. The input manifold section 18 is connected to respective outlet openings 24", 25", 26", 27" from the separator sections 14, 15, 16, 17 being located in a bottom section of the inclined separator sections (ref. FIG. 2).

In this illustrated example of fluid interconnections, there is for example a high percentage fraction of gas in the fluid from the well head. The fluid streaming through the common inlet opening 29 passes a first separator section 14 wherein the gas is separated from the fluid because the density of the gas is lower than other fluid phases present in the incoming fluid. The gas phase is transported out through the outlet 24 in the upper section of the inclined separator section 14 to the outlet pipe 11 via the output manifold section 19 located in the top section of the inclined separator system. The outlet opening 24" of the first separator section 14 is connected in parallel to inlet openings 25', 26', 27' of the respective separator sections 15, 16, 17 thereby providing a sufficient separator capacity for separating oil from water and sand, for example. The oil phase is transported out of the separator system via the respective outlets 25, 26, 27 of the respective separator sections 15, 16, 17, and in the output manifold section 19, these outlets are connected together and are connected to the outlet pipe 12 of the separator system. The water and sand phase is transported out of each respective separator section 15, 16, 17 being configured to separate oil from water and sand via the outlet openings 25", 26", 27" being located in the bottom section of the inclined separator system. The pipe section 22 is connected to these outlet openings 25", 26", 27" in the input manifold section 18, and in the other end to the output manifold section 19 being in fluid communication with the outlet pipe 13 of the example of embodiment depicted in FIG. 1.

The interconnection pattern provided for with pipe connections in the input manifold section 18 is reflected in the output manifold section 19. The pattern of interconnecting pipes reflects the properties of the incoming fluids from an oil well, while the interconnection pattern in the output manifold section 19 reflects how many fluid phases that are to be separated and how different fluid phases will still be combined. Therefore, there is a functional relationship between the interconnecting pattern of pipes in the input manifold section 18 and the output manifold section 19, but not necessary as a one to one mapping of the configuration of the respective pipes in each respective manifold section.

Figure 2A:
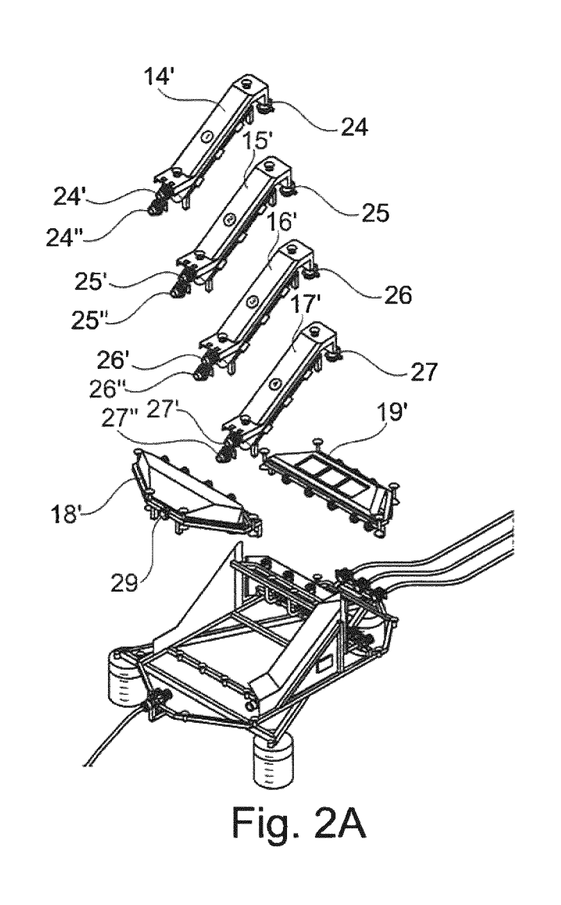
FIG. 2 illustrates an exploded view of an example of embodiment of a separator system used in the method of the present invention.
Figure 2B:
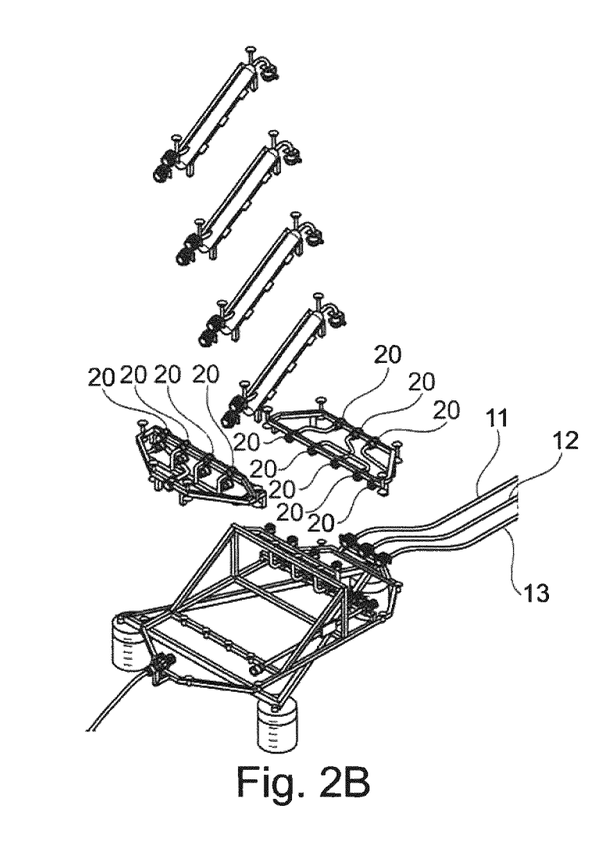

FIG. 2a and FIG. 2b illustrate respective exploded views of a separator system as illustrated in FIG. 1 comprising releasable modules 14', 15', 16', 17' 18', 19'. For example, as illustrated in FIG. 2A, the modules 14', 15', 16', 17' comprises the separator sections 14, 15, 16, 17 illustrated in FIG. 1. In the bottom section of each respective module 14', 15', 16', 17' there are arranged inlet openings 24', 25', 26' and outlet openings 24", 25", 26", 27" while in the top section there are arranged outlet openings 24, 25, 26, 27. Respective pipes providing fluid communication in and out of respective modules are fitted with releasable tube joints 20. VECON® Tie-in system and KC-4 and KC-5 Collet releasable tube joints from FMC Technologies can for example be used in subsea installations of embodiments of the present invention.

FIG. 2A illustrates the modules with enclosures protecting the respective modules. In FIG. 2B the protective enclosures has been removed for revealing details of the respective modules.

In another example of embodiment, the releasable tube joints 20 is further in fluid communications with adjustable vents 21 located for example adjacent to the tube joints 20, or the tube joints themselves may be equipped with adjustable vents. The vents provide closing or opening of flow of fluids through an associated pipe sections in addition to enabling adjustments of the flow of fluids in the separator system. For example, it is possible to balance the flow from input to output through the separator system. When a module needs to be replaced the vents can close flow of fluids in associated pipe sections before a section is released and then replaced. In some examples of embodiments of the present invention, a controller may operate electric signals controlling the vents. For example, transducers measuring respective physical and chemical properties may submit measurement signals to the controller which then can evaluate the measurement signals and eventually submit control signals to selected vents thereby adjusting flow through associated pipe sections.

Figure 3A:
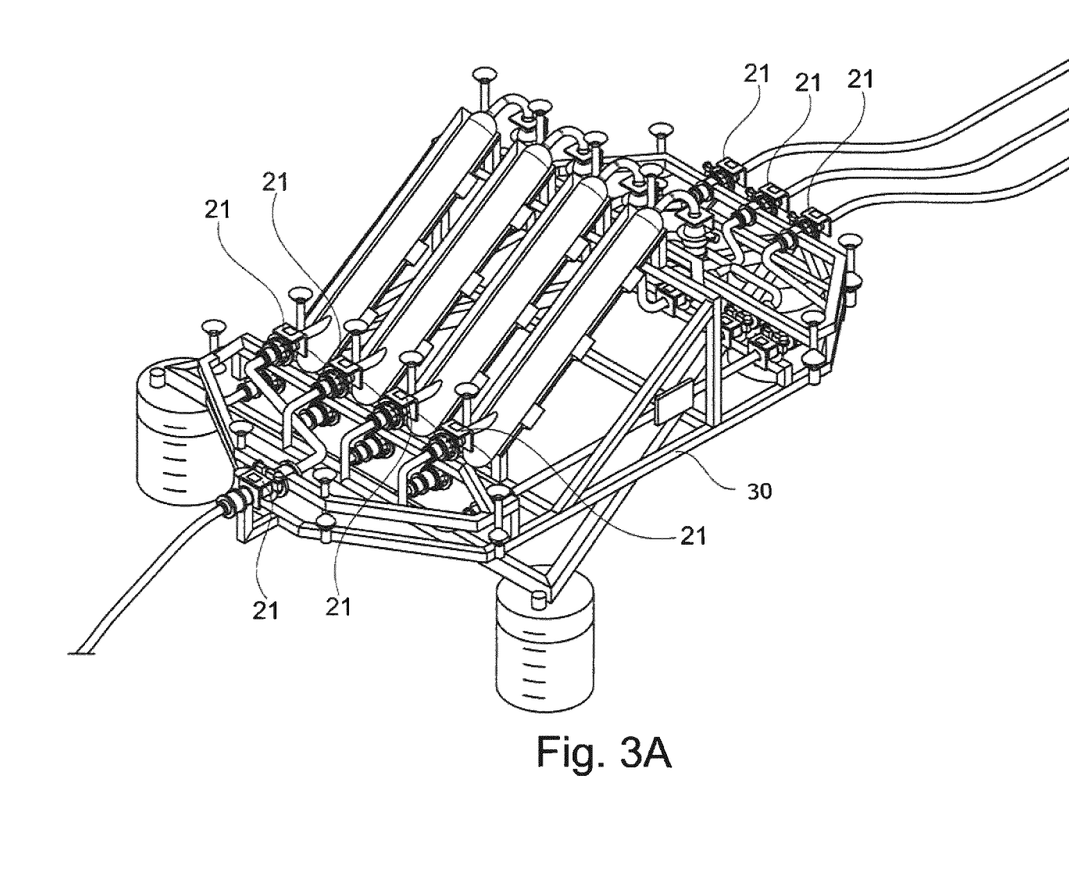
FIG. 3a and FIG. 3b illustrate a perspective view of a separator system used in the method according to the present invention.
Figure 3B:
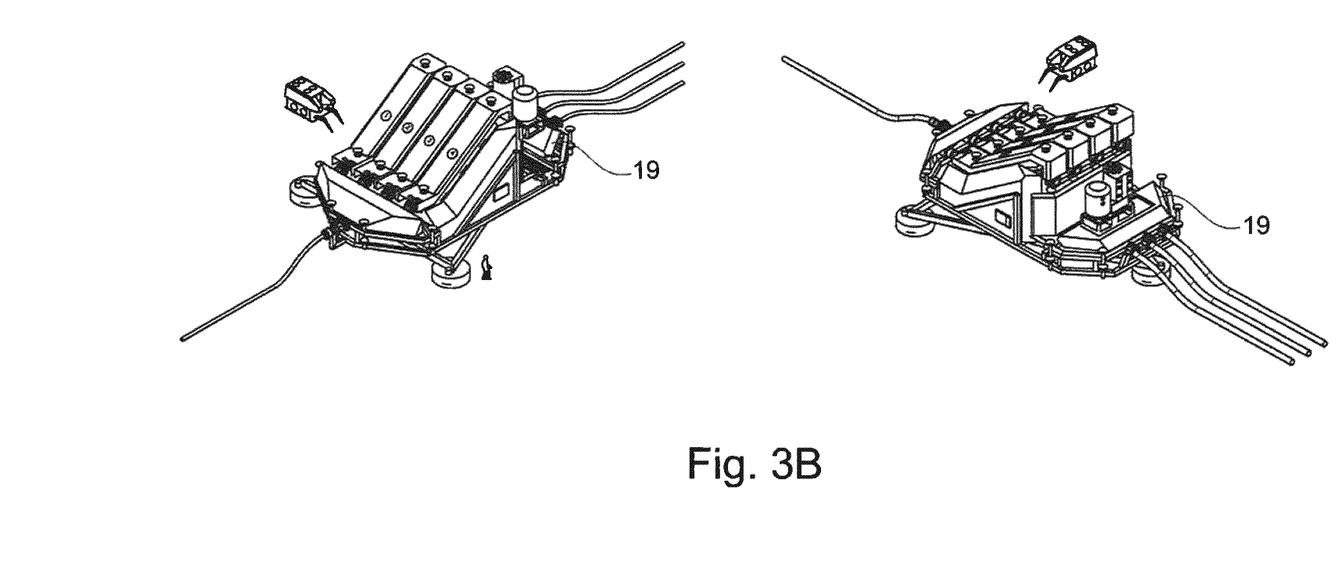

FIG. 3A and FIG. 3B illustrates different perspective views of an assembled separator system according to the present invention. There is also illustrated how a Remote Operated subsea Vehicle may be used in inspection and assembly of the separator system when deployed on the sea bed. The example of embodiment comprises also additional modules located behind top section and on top of the output manifold section 19. These units may be one phase pumps to provide better flow rates in a system. It is also within the scope of the present invention to use active separator sections like a cyclone separator. These units may then be motor sections driving cyclone separators, for example.

According to an aspect of the separator system used in the method according to the present invention, both separator sections based on gravitation as well as active separators may be used in examples of embodiments.

In an example of a separator system separating mixed fluids from oil wells is supported by a template 30 as illustrated in FIG. 2A and FIG. 2B. The system comprises a plurality of separator sections 14, 15, 16, 17 arranged with inlet and/or respective outlet openings 24, 25, 26, 27, 24', 25', 26', 27', 24", 25", 26", 27" in lower and upper ends of the respective separator sections. A pipe section 22 comprising at least one pipe is facilitating fluid communication between outlet openings in upper ends of a selection of separator sections, and inlet openings in lower ends of another selection of separator sections, and vice versa. A common inlet opening 20 connected to a pipe 10 conveying mixed fluids from oil wells is in fluid communication with an input manifold section 18. The input manifold section is adapted provide a pattern of fluid communication between the common inlet opening, the at least one pipe of the pipe section 22, and respective ones of the plurality of separator sections, wherein a specific adapted pattern of fluid communication in the input manifold section is dependent on a specific composition of mixed fluids conveyed from oil wells and/or specific production requirements. There is at least two outlet openings 11, 12, 13 connectable to respective external pipes conveying respective separable fluid phases, wherein an output manifold section 19 is configurable to provide an adaptable pattern of fluid communication between the at least two outlet openings, the at least one pipe of the pipe section, and respective ones of the plurality of separator sections, wherein a specific adapted pattern of fluid communication in the output manifold section is a function of the specific pattern of fluid communication being configured in the input manifold section.

Respective examples of configurations are described below. The interconnecting pipes in the input manifold section and the output manifold section have a pattern of interconnections providing a defined separation scheme for a specific separation system. In an example of embodiment, the input manifold section 18 and respective output manifold section 19 may be replaced with another manifold with a different interconnecting pattern. In this manner it is possible to adapt the configuration of the separator system to any configuration adapting the separator system to changing requirements of the oil field or production requirements. The examples illustrated below are examples of configurations that are interchangeable just by replacing respective input manifold section 18 and respectively the output manifold section 19 with an interconnecting pipe configuration realizing the different adaptable pipe patterns.

Figure 4A:
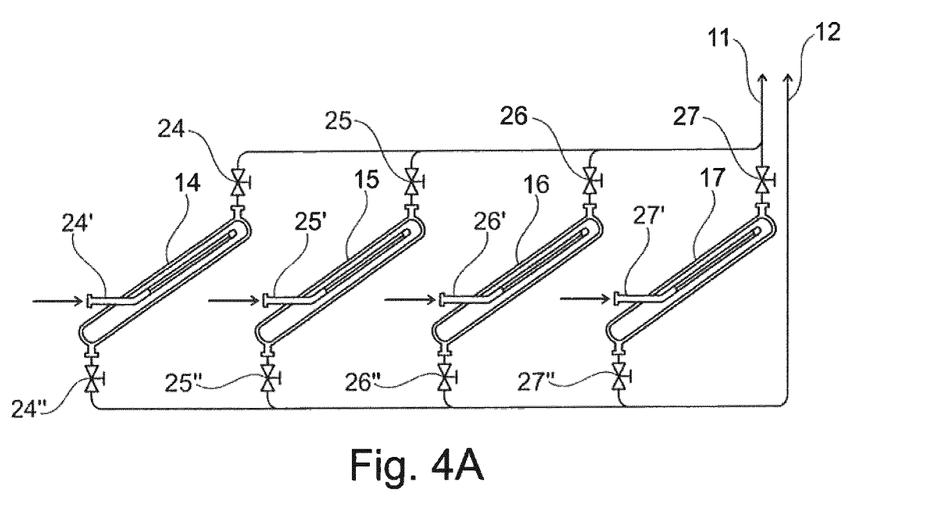
FIG. 4a and FIG. 4b illustrate an example of configuration of a separator system used in the method according to the present invention.

FIG. 4A illustrates an example of configuration of four separator sections used in the present invention, wherein the fluid from an oil well is distributed in parallel by a input manifold section (not shown) to each respective inlet opening 24', 25', 26', 27', of each respective inclined separator section 14, 15, 16, 17. The outlet openings 24, 25, 26, 27 located in the top section of the inclined separator sections are collected in one outlet pipe 11 via a output manifold section (not shown). The outlet openings 24", 25", 26", 27" in the bottom sections of the respective separator sections are collected by the pipe section 22 and via the input and output manifold sections 18, 19 to a second outlet pipe 12. The volume of gas may be large while the volume of oil and water is moderate. In this configuration gas is separated from oil mixed with water and sand (two phase separation).

Figure 4B:
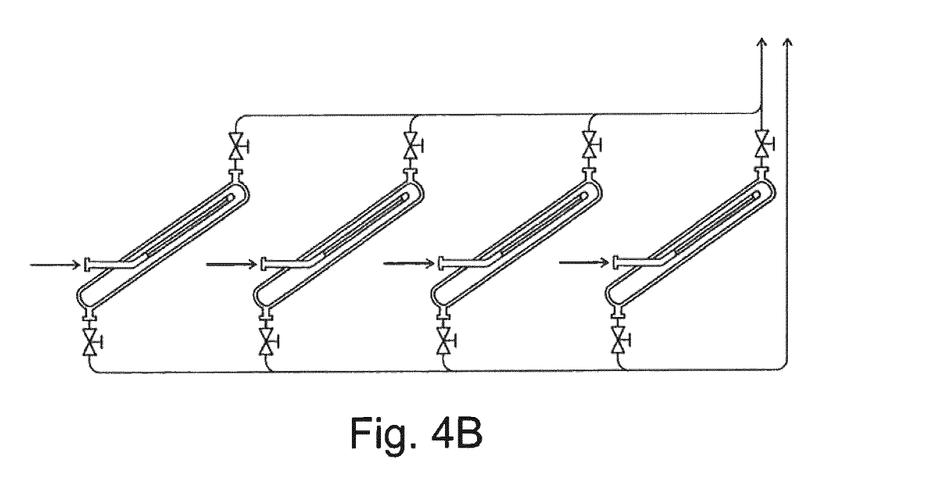

FIG. 4B has a same configuration as depicted in FIG. 4A. The configuration is suitable for an oil field with very low volume of gas, large volume of oil and moderate volume of water. Oil with dissolved gas is separated from water and sand (two phase separation).

Figure 5A:
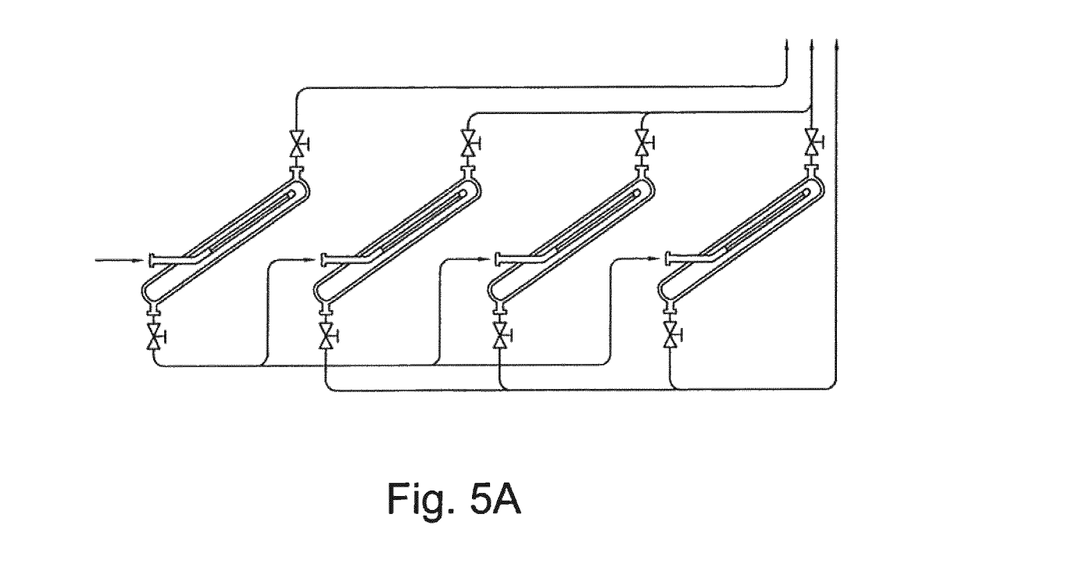
FIG. 5a and FIG. 5b illustrate other examples of embodiments of a separator system used in the method according to the present invention.

FIG. 5A depicts an example of configuration adaptabted to an oil field with moderate volume of gas located in deep waters. The volume of gas is moderate, the volume of oils is large and the volume of water and sand is moderate. The first separator (viewed from the left in the figure) separate gas from the oil mixed with water and sand. The mixture of oil, water and sand from the first separator is then separated in a parallel arrangement between the second, third and fourth separator. The output from the second, third and fourth separator is the oil and a mixture of water and sand. This configuration is a two phase separator.

Figure 5B:
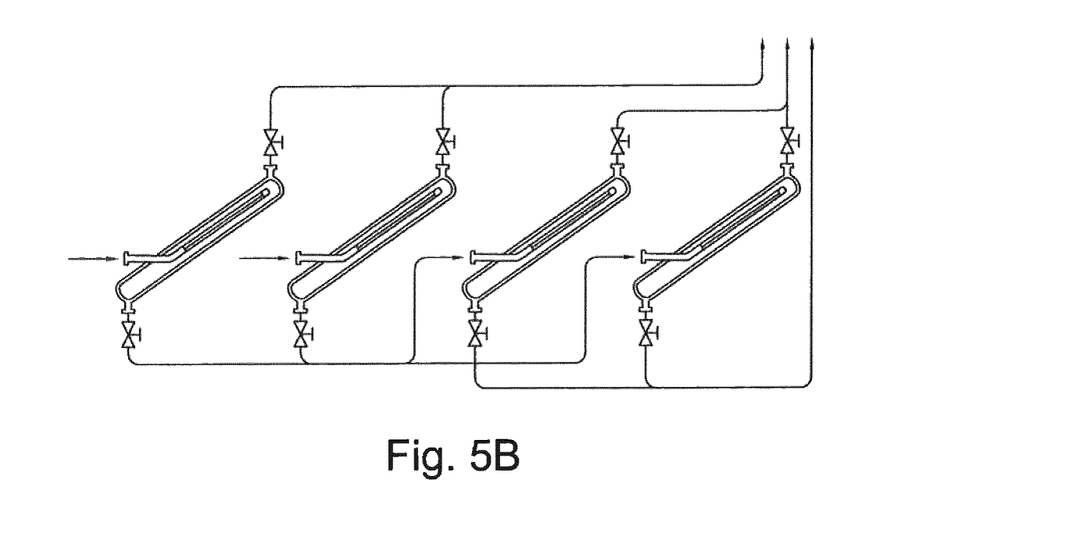

FIG. 5B shows a configuration with a large volume of gas and moderate volume of oil, water and sand. The gas is separated from the oil and, water and sand mixture in two parallel separator section arrangements. This configuration is a two phase separator.

Figure 6A:
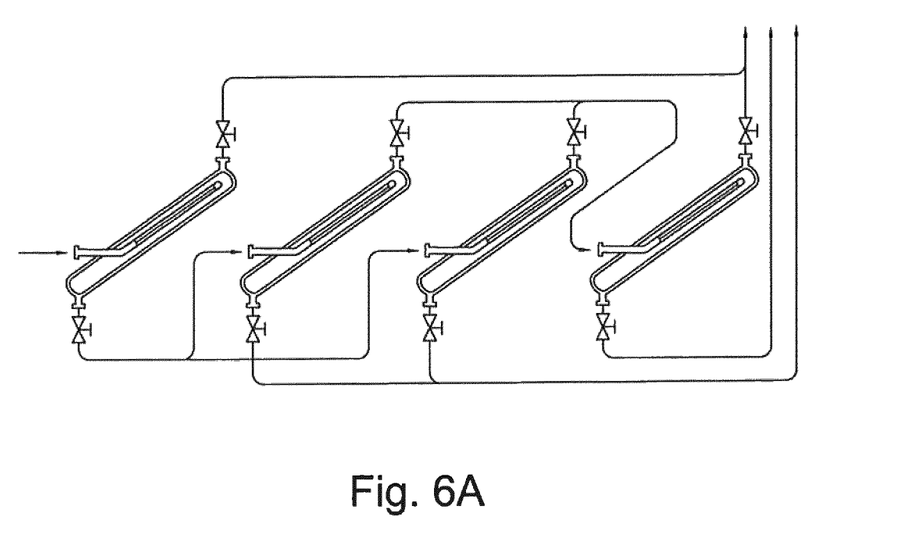
FIG. 6a and FIG. 6b illustrate further examples of embodiments of a separator system used in the method according to the present invention.

FIG. 6A depicts an example of configuration adapted to an oil field with low volume of gas, moderate volume of oil and large volume of water and sand. The oil is separated from a mixture of water and sand, and the water is separated from the sand in two parallel separator sections (three phase separation). The first separator (viewed from the left in the figure) separates the oil while the two next separator sections separate the sand in parallel from the water and sand mixture from the first separator. The remaining water and oil from these two separators are then separated in the last separator section. The last separator separates the water. This is a three phase separator.

Figure 6B:
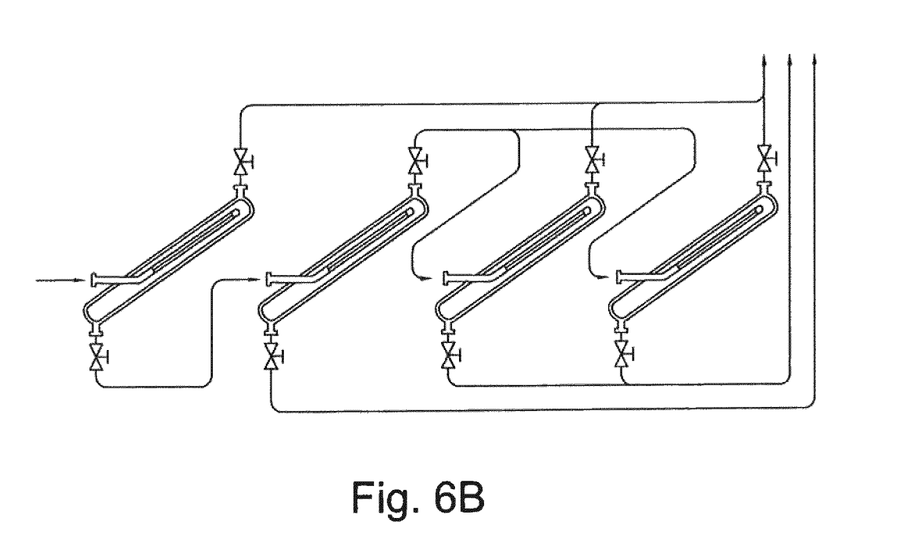

FIG. 6B depicts a configuration suitable for an oil field with low volume of gas, moderate volume of oil and large volumes of water and sand as in the example depicted in FIG. 6A. However, in this example of a configuration there is a parallel separator arrangement for the water separation. This is a three phase separator.

Figure 7A:
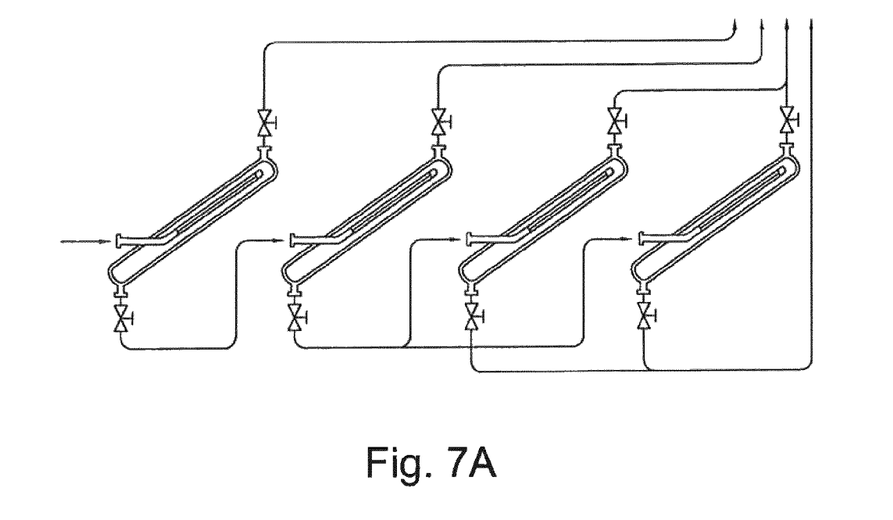
FIGS. 7a and 7b illustrate yet further examples of embodiments of a separator system used in the method according to the present invention.
Figure 7B:
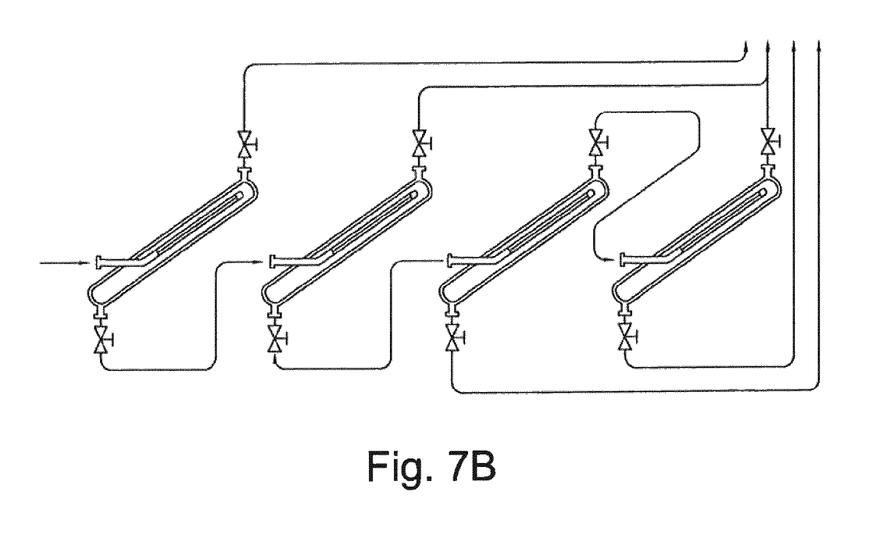

FIG. 7A and FIG. 7B illustrates additional configurations of the system used in the method according to the present invention.

It is further within the scope of the present invention that the adaption of the separator systems fluid communication may be provided for a specific configuration of the input manifold section and corresponding output manifold section may optionally comprise adding or removing at least one separator section.

In another example the template supporting the separator sections may optionally provide a common adaption of the inclination angle of the inclined separator system, or optionally provide an individual adjustment of each respective separator section. In this example, the pipes from the separator sections out to surrounding and connecting pipes may be provided for as flexible tube sections. The adjustment of the inclination angle may influence the efficiency of the separation provided for in the separator section. Experience with inclined separator systems based on gravitation indicates inclination angles in the region of 5° to 20° both positive and negative, i.e. upwards and downwards flow, respectively, relative to the horizontal plane. However, it is within the scope of the present invention to use different inclination angles related to the type of separation force that is being used in a separator section. For example, if a cyclone type of separator section is used, a 90° inclination angle may be preferable. Adjustments after installation may counteract deficiencies in the foundation the separator system is located on to preserve a defined optimal or functional inclination angle.

In oil pipe line systems it is often necessary to send inspection vehicles inside the pipe lines to make sure that there are no damage or dangerous corrosion in the inner walls of the pipes. It may also be necessary to remove deposits from the fluids flowing in the pipes.

To enable passing of a vehicle of this type through a separator system according to the present invention, it is possible to arrange an optional pipe as a feed through channel in the pipe section 22 to be in direct contact with the common inlet opening 29 through the input manifold section 18 via the output manifold section 19 and out into a pipe outlet conveying for example oil and/or gas.

In an example as depicted in FIG. 8, a separator section has an inclined separator pipe section with an inner pipe 80 located centred inside an outer pipe 85, wherein the inner pipe is in fluid communication with the input manifold section via an inlet opening on a side wall of the outer pipe at a bottom section of the inclined separator pipe section, wherein the opening is in fluid communication via a curved pipe 83 to a bottom surface of the inner pipe located inside the outer pipe, wherein the bottom surface 82 of the inner pipe is arranged with a conical shape, wherein a section with smaller radius of the cone shape is connected to the curved pipe while a section with a larger radius of the cone is connected to the inner pipe, walls of the inner pipe is perforated with a plurality of parallel and elongated slots 81, and the inner pipe is terminated and closed in a section located at a top section of the inclined separator pipe section, the outer pipe has a first outlet opening 86 arranged in the top section and a second outlet opening 84 arranged in the bottom section of the inclined separator pipe section. The curved pipe 83 provides a small cyclone effect separating oil and water in two layers before the mixed fluid enter the conical shaped part 82. The conical shape will reduce the speed of the fluid before passing the elongated slots 81. The elongated slots 81 are providing less turbulence in the fluids compared to traditional perforation as known in prior art. Further, the possible suction problem as described in known art is eliminated with this design of the slots since the directions of the slots are in the flow direction of the fluids. In this example the inner pipe 80 is placed centred in the outer pipe, but a non-centred location may also be chosen, such as offset downwards to obtain a larger volume between an upper side of the inner pipe and an upper side of the outer pipe in order to let gas and oils exit easier from the inner pipe. Also, the offset causing the larger volume above the inner pipe enhances conditions for a laminar flow above the inner pipe.

Figure 9:
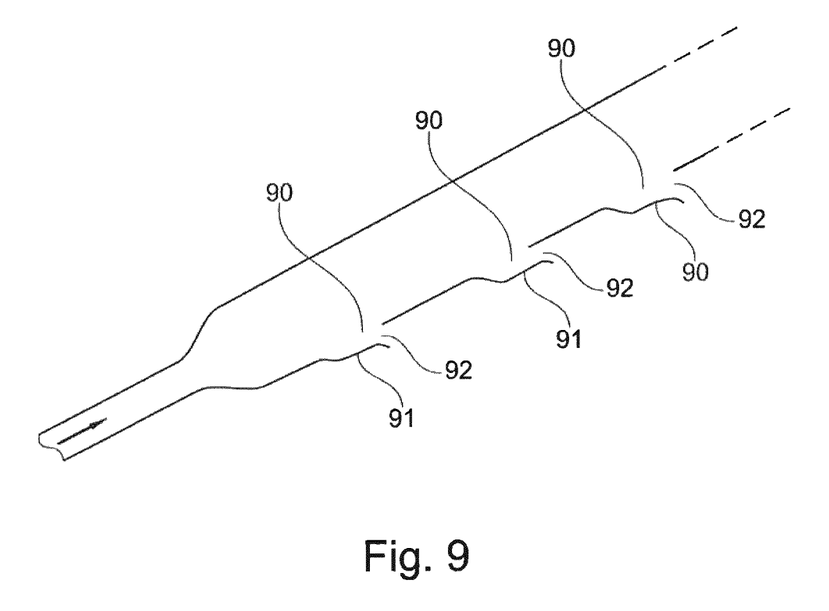
FIG. 9 illustrates another example of a separator section used in the method according to the present invention.

According to another example as depicted in FIG. 9, the walls of the inner pipe is optionally perforated with a plurality of circular shaped openings 90, wherein rounded cover caps 91 are arranged over the circular shaped openings, and wherein an opening 92 in the rounded covering cap surfaces are arranged upstream relative to fluid flow direction in the inner pipe, and wherein the opening in the rounded cap surfaces constitutes a surface being perpendicular to the side walls of the inner pipe. With this arrangement the openings of the circular shaped openings will not experience a streaming of fluids passing the openings and thereby providing a suction force due to the Venturi effect. Further, the openings together with the covering caps provide an increase in the diameter of the pipe over the opening area thereby reducing the speed of fluids passing the openings. This will enable increased separation efficiency. The smooth shaping of the covering cap surfaces provides a guiding of fluids along the smooth cap surfaces due to the Coanda effect. The resulting effect is that there is a reduced risk of turbulence in the streaming of fluids due to the openings.

It is also within the scope of the present invention to provide a method of estimating a design of fluid communication in an input manifold section and a corresponding output manifold section in examples of embodiments of the present invention that takes into account oil well parameters as well as production requirements.

A first step in an example of a method according to the present invention is to determine a percentage fraction of respective fluid phases in fluids from a specific oil well. This can be done for example by placing a defined volume of a sample of oil from the oil well in a closed glass pot and wait until gravity has separated water and oil with gas on top of the oil in the pot. The sand will be mixed with the water, but by emptying, gas, oil and water from the pot the remaining amount of sand can be identified. The next step is to estimate a specific production rate from the oil well. This is done when the oil field is surveyed. A sample production period is used to establish a statistical significant production rate and is available as data for every oil field.

When specific volumes of fluid phases are established it is possible to calculate or estimate a streaming capacity of each separator section based on the production rate and the specific volumes of respective fluid phases.

Then it is possible to estimate a number of parallel and serial sections of a configuration of separator sections as well as length, diameter and type and size of slots in the inner tube.

Then it is possible to translate this estimate to a concrete configuration of the respective input manifold section and the corresponding output manifold section.

During the life time of the oil field it is possible to repeat the step of estimating percentage fraction of respective fluid phases or components. If the there is a deviation, for example of volume of water above a predefined threshold level, it is possible to recalculate or perform a new estimate of fluid composition of the fluids and corresponding flow rates from the oil well. Then it is possible to provide an adaption of fluid communication provided for in the respective input manifold section and corresponding output manifold section thereby adapting the separator system to identified changes of fluid conditions.

In these examples of the method steps it is possible to take into account different types of separator sections that are used. The difference between for example a separator based on gravity compared to a cyclone type of separator is the streaming capacity and expected separation efficiency of each separator section. These differences can be taken into consideration when performing the method according to the present invention.

The invention claimed is:

1. Method of adapting and manufacturing a separator system comprising multiple inclined separators, where each separator comprises an assembly of
   an elongated outer, closed tubular section and an elongated, inner tubular section, which is closed in one end and open in another end;
   the inner tubular section is arranged inside the outer tubular section;
   oil well substances are introduced into the open end of the inner tubular section via a tube feed section passing through the outer tubular section and into the inner tubular section;
   the inner tubular section comprises multiple slots arranged in a longitudinal direction of the inner tubular section in a circumferential manner;
   the separator has an inclination that facilitates separation of the oil well substances into lower density substances and higher density substances; and
   the lower density substances drift upward due to buoyancy through the slots and exit via an upper outlet in the outer tubular section and higher density substances sink downward through the slots and by gravitation exit via a lower outlet in the outer tubular section;
   wherein the method comprises:
   a) determining a percentage fraction of respective fluid phases in an oil from a specific oil well and at a specific time;
   b) estimating an expected production rate from the specific oil well at a specific time;
   c) using the percentage fraction and the expected production from step a) and step b) to estimate a streaming capacity of each respective fluid phase through separators of the separator system,
   d) using the respective estimates from step c) to adapt multiple separators by connecting an estimated number of separators in a serial manner to accommodate enough separator efficiency in the separator system, thereby enabling a separation of a fluid phase to a target purity of the fluid phase; and
   e) using the results in c) and d) to
      i) arrange at least one first interconnecting framework of pipes providing communication of fluids from a common inlet of fluids into one or more open ends of the inner tubular sections in respective parallel and serial interconnected separators of the separator system; and
      ii) arrange at least one second interconnecting framework of pipes providing communication to respective outlets for each respective fluid phase outputs of the separator system.

2. Method according to claim 1, wherein the method further comprises expanding step d) by using the results in steps c) and e) to
   i) arrange at least one first interconnecting framework of pipes providing communication of fluids from a common inlet of fluids into open one or more ends of the inner tubular sections in respective parallel and serial interconnected separators of the separator system;
   ii) arrange at least one second interconnecting framework of pipes providing communication to respective lower outlets for separated higher density fluid phase outputs of the separator system; and
   iii) arrange at least one third interconnecting framework of pipes providing communication to respective higher outlets for separated lower density fluid phase outputs of the separator system.

3. Method according to claim 2, wherein the first, second or third interconnecting framework of pipes respectively are replaced after installation of the separator system, thereby enabling an adaption of the separator system with respect to changes in composition of the fluids from the oil wells or changing production requirements, or due to maintenance requirements.

4. Method according to claim 2, wherein the inclination of the respective separators are adjusted to a common level or to individual levels for each respective separator.

5. Method according to claim 1, further comprising a third interconnecting framework of pipes, wherein the first, second, or third interconnecting framework of pipes respectively are replaced after installation of the separator system, thereby enabling an adaption of the separator system with respect to changes in composition of the fluids from the oil wells or changing production requirements, or due to maintenance requirements.

6. Method according to claim 5, where the first, second or third interconnecting framework of pipes are replaced with interconnection frameworks of pipes providing a different flow through the separators than an earlier interconnection of frameworks of pipes.

7. Method according to claim 6, wherein when an interconnecting framework of pipes are replaced with interconnection frameworks of pipes providing a different flow through the separators than an original interconnection of frameworks of pipes, the interconnecting framework providing a different flow comprises adding or removing at least one separator.

8. Method according to claim 6, wherein the frameworks of pipes are connected to the separators by releasable tube joints.

9. Method according to claim 6, wherein the separators or frameworks of pipes are fitted with adjustable vents.

10. Method according to claim 5, wherein the frameworks of pipes are connected to the separators by releasable tube joints.

11. Method according to claim 2, wherein the separators or frameworks of pipes are fitted with adjustable vents.

12. Method according to claim 5, wherein the separators or frameworks of pipes are fitted with adjustable vents.

13. Method according to claim 5, wherein the inclination of the respective separators are adjusted to a common level or to individual levels for each respective separator.

14. Method according to claim 1, wherein the separators or frameworks of pipes are fitted with adjustable vents.

15. Method according to claim 14, further comprising replacing an interconnecting framework of pipes having a flow rate through the separators with a different interconnecting frameworks of pipes having a different flow rate through the separators and adjusting the vents.

16. Method according to claim 15, wherein respective adjustments of the adjustable vents are provided for by electric control signals issued from an associated controller in the system.

17. Method according to claim 1, wherein the inclination of the respective separators are adjusted to a common level or to individual levels for each respective separator.

18. Method according to claim 1, wherein the method further comprises:
   performing at regular intervals step a) and investigating if one or more percentage fractions of respective fluid phases has changed above a pre-defined threshold level, and
   if a threshold level has been exceeded, then re-performing steps b), c), d), and e).

19. Method according to claim 18, wherein the method further comprises adapting the separator system by replacing existing frameworks of interconnecting pipes with different frameworks of pipes in a configuration arranged for at least one changed level.

20. Method of adapting and manufacturing a separator system comprising multiple inclined separators where each separator comprises an assembly of an elongated outer tubular section and an elongated inner tubular section; the inner tubular section is arranged inside the outer tubular section and oil well substances are introduced into an open end of the inner tubular section, separated by the inner tubular section, and exit through an outlet in the outer tubular system; wherein the method comprises:
   a) determining a percentage fraction of respective fluid phases in an oil from a specific oil well and at a specific time;
   b) estimating an expected production rate from the specific oil well at a specific time;
   c) using the percentage fraction and expected production rates from step a) and step b) to estimate a streaming capacity of each respective fluid phase through separators of the separator system,
   d) using the respective estimates from step c) to adapt multiple separators by connecting an estimated number of separators in a serial manner to accommodate enough separator efficiency in the separator system, thereby enabling a separation of a fluid phase to a target purity of the fluid phase; and
   e) using the results in c) and d) to
      i) arrange at least one first interconnecting framework of pipes providing communication of fluids from a common inlet of fluids into one or more open ends of the inner tubular sections in respective parallel and serial interconnected separators of the separator system; and
      ii) arrange at least one second interconnecting framework of pipes providing communication to respective outlets for each respective fluid phase outputs of the separator system.

* * * * *